US007947916B2

(12) United States Patent
Stemmle

(10) Patent No.: US 7,947,916 B2
(45) Date of Patent: May 24, 2011

(54) MAIL SORTER SYSTEM AND METHOD FOR MOVING TRAYS OF MAIL TO DISPATCH IN DELIVERY ORDER

(75) Inventor: Denis J. Stemmle, Stratford, CT (US)

(73) Assignee: Lockheed Martin Corporation, Bethesda, MD (US)

( * ) Notice: Subject to any disclaimer, the term of this patent is extended or adjusted under 35 U.S.C. 154(b) by 780 days.

(21) Appl. No.: 11/544,184

(22) Filed: Oct. 6, 2006

(65) Prior Publication Data

US 2008/0083662 A1 Apr. 10, 2008

(51) Int. Cl.
*G06K 9/00* (2006.01)

(52) U.S. Cl. ......................... 209/584; 209/617; 209/900

(58) Field of Classification Search .................. 209/584, 209/617, 900
See application file for complete search history.

(56) References Cited

U.S. PATENT DOCUMENTS

| | | | |
|---|---|---|---|
| 3,420,368 | A | 1/1969 | Sorrells |
| 3,452,509 | A | 7/1969 | Hauer |
| 3,587,856 | A | 6/1971 | Lemelson |
| 3,757,939 | A | 9/1973 | Henig |
| 3,889,811 | A | 6/1975 | Yoshimura |
| 3,901,797 | A | 8/1975 | Storace |
| 3,904,516 | A | 9/1975 | Chiba |
| 3,933,094 | A | 1/1976 | Murphy |
| 4,008,813 | A | 2/1977 | Leersnijder |
| 4,058,217 | A | 11/1977 | Vaughan |
| 4,106,636 | A | 8/1978 | Ouimet |
| 4,169,529 | A | 10/1979 | Hunter |
| 4,244,672 | A | 1/1981 | Lund |
| 4,507,739 | A | 3/1985 | Haruki |
| 4,627,540 | A | 12/1986 | Takeda |
| 4,688,678 | A | 8/1987 | Zue |
| 4,738,368 | A | 4/1988 | Shaw |
| 4,868,570 | A | 9/1989 | Davis |
| 4,874,281 | A | 10/1989 | Bergerioux |
| 4,891,088 | A | 1/1990 | Svyatsky |
| 4,895,242 | A | 1/1990 | Michel |
| 4,921,107 | A | 5/1990 | Hofer |
| 4,923,022 | A | 5/1990 | Hsieh |
| 4,965,829 | A | 10/1990 | Lemelson |

(Continued)

FOREIGN PATENT DOCUMENTS

JP 1159088 6/1989

(Continued)

OTHER PUBLICATIONS

"Development of in-process skew and shift adjusting mechanism for paper handling," American Society of Mechanical Engineers http://www.directtextbook.com, 1998.

*Primary Examiner* — Terrell H Matthews

(74) *Attorney, Agent, or Firm* — Leland Schultz, Esq.; Roberts Mlotkowski Safran & Cole, P.C.

(57) ABSTRACT

A sorter, method, and software product are provided for sorting mail pieces. The mail pieces are fed into a sorter, sorted, and then deposited into mail trays. The mail trays are then moved from the deposit area to a dispatch area, in the order they will be loaded into a truck. That order is preferably the same as the order in which the containers received the mail pieces.

11 Claims, 7 Drawing Sheets

U.S. PATENT DOCUMENTS

| | | | | |
|---|---|---|---|---|
| 5,031,223 | A | 7/1991 | Rosenbaum | |
| 5,042,667 | A | 8/1991 | Keough | |
| 5,119,954 | A * | 6/1992 | Svyatsky et al. | 209/584 |
| 5,186,336 | A | 2/1993 | Pippin | |
| 5,291,002 | A | 3/1994 | Agnew | |
| 5,470,427 | A | 11/1995 | Mikel | |
| 5,480,032 | A | 1/1996 | Pippin | |
| 5,718,321 | A | 2/1998 | Brugger | |
| 5,981,891 | A | 11/1999 | Yamashita | |
| 6,126,017 | A | 10/2000 | Hours | |
| 6,227,378 | B1 | 5/2001 | Jones | |
| 6,276,509 | B1 | 8/2001 | Schuster | |
| 6,316,741 | B1 | 11/2001 | Fitzgibbons | |
| 6,347,710 | B1 | 2/2002 | Ryan | |
| 6,365,862 | B1 | 4/2002 | Miller | |
| 6,403,906 | B1 | 6/2002 | De Leo | |
| 6,435,353 | B2 | 8/2002 | Ryan | |
| 6,437,272 | B2 | 8/2002 | Tamamoto | |
| 6,443,311 | B2 | 9/2002 | Hendrickson | |
| 6,555,776 | B2 | 4/2003 | Roth | |
| 6,561,339 | B1 | 5/2003 | Olson | |
| 6,561,360 | B1 | 5/2003 | Kalm | |
| 6,587,806 | B2 | 7/2003 | Mangiameli | |
| 6,677,548 | B2 | 1/2004 | Robu | |
| 6,685,030 | B1 | 2/2004 | Mileaf | |
| 6,814,210 | B1 | 11/2004 | Hendzel | |
| 6,897,395 | B2 | 5/2005 | Shiibashi | |
| 6,946,612 | B2 | 9/2005 | Morikawa | |
| 6,953,906 | B2 | 10/2005 | Burns | |
| 6,994,220 | B2 | 2/2006 | Schererz | |
| 7,004,396 | B1 | 2/2006 | Quine | |
| 7,060,926 | B2 | 6/2006 | Edmonds | |
| 7,111,742 | B1 | 9/2006 | Zimmermann | |
| 7,112,031 | B2 | 9/2006 | Harres | |
| 7,138,596 | B2 | 11/2006 | Pippin | |
| 7,154,060 | B2 | 12/2006 | Rosenbaum | |
| 7,170,024 | B2 | 1/2007 | Burns | |
| 7,210,893 | B1 | 5/2007 | Overman | |
| 7,227,094 | B2 | 6/2007 | Oexle | |
| 7,235,756 | B2 | 6/2007 | De Leo | |
| 7,259,346 | B2 | 8/2007 | Svyatsky | |
| 7,304,260 | B2 | 12/2007 | Boller | |
| 7,378,610 | B2 | 5/2008 | Umezawa | |
| 7,396,011 | B2 | 7/2008 | Svyatsky | |
| 7,397,010 | B2 | 7/2008 | Wilke | |
| 7,397,011 | B2 | 7/2008 | Berdelle-Hilge | |
| 2002/0053533 | A1 | 5/2002 | Brehm | |
| 2002/0139726 | A1 * | 10/2002 | Roth et al. | 209/584 |
| 2003/0006174 | A1 | 1/2003 | Harres | |
| 2004/0159592 | A1 * | 8/2004 | McLaughlin et al. | 209/584 |
| 2005/0252836 | A1 * | 11/2005 | Burns et al. | 209/609 |
| 2006/0070929 | A1 | 4/2006 | Fry | |
| 2006/0124512 | A1 | 6/2006 | Quine | |
| 2006/0180520 | A1 | 8/2006 | Ehrat | |
| 2006/0191822 | A1 | 8/2006 | Avant | |
| 2007/0090029 | A1 | 4/2007 | Avant | |
| 2007/0131593 | A1 * | 6/2007 | Burns et al. | 209/584 |
| 2007/0209976 | A1 * | 9/2007 | Worth et al. | 209/584 |
| 2007/0273086 | A1 | 11/2007 | Stemmle | |
| 2008/0011653 | A1 | 1/2008 | Stemmle | |
| 2008/0012211 | A1 | 1/2008 | Stemmle | |
| 2008/0027986 | A1 | 1/2008 | Stemmle | |
| 2008/0083662 | A1 * | 4/2008 | Stemmle | 209/584 |
| 2008/0093273 | A1 | 4/2008 | Stemmle | |
| 2008/0093274 | A1 | 4/2008 | Stemmle | |
| 2008/0164185 | A1 | 7/2008 | Stemmle | |
| 2008/0179225 | A1 * | 7/2008 | Bowers et al. | 209/584 |

FOREIGN PATENT DOCUMENTS

| | | |
|---|---|---|
| JP | 1271789 | 10/1989 |
| WO | WO2006/063204 | 6/2006 |

* cited by examiner

MAIL SORTER SYSTEM AND METHOD FOR MOVING TRAYS OF MAIL TO DISPATCH IN DELIVERY ORDER

TECHNICAL FIELD

The present invention relates generally to mail sorting, and more particularly to sorting mail into trays.

BACKGROUND OF THE INVENTION

In centralized postal sorting centers, mail is typically passed through automated sorting systems multiple times. After the last pass through the sorters, the mail must be placed in mail trays and eventually loaded onto trucks by a deadline for dispatching the mail in the trucks to the correct delivery offices. Each truck will typically take mail trays to several different delivery offices, and each of the delivery offices is then responsible for taking the mail to particular final destinations along multiple different mail routes.

Typically, 20 to 40 pieces of various types of sorting equipment are used within a centralized postal sorting center. Often, the mail destined for a single delivery office might be sorted on several types of sorters in different locations throughout the sorting center. After the last pass on each of the sorters, the trays of sorted mail must then themselves be sorted, in order to ensure that all the mail destined for the same destination is loaded in an intelligent order onto the trucks going to that destination.

The average sorting center in the United States Postal Service (USPS) system sorts the mail for about 713 routes, and delivers it to 35 delivery offices, each of which have an average of 20 routes of mail to be delivered. Typically, 60,000 trays of sorted mail must all be sorted and put on the correct trucks at the average sorting center. Trays of mail from various sorter systems (i.e. letter sorters and flats sorters, as well as mail that is manually sorted such as non-machineable mail and newspapers) must be collected together in the same place before they are loaded onto the correct trucks, and/or while they are loaded onto the correct trucks.

Most sorting centers have invested in substantial equipment to transport, store, and retrieve the trays of mail in support of the sorting operations. But often, the final operation of sorting the trays of mail to get them all on the right trucks is a manual operation. In average-sized sorting centers, dozens of workers are required for several hours to sort the trays of mail and get them onto the right trucks on time.

At the most advanced postal services (i.e. "posts") in the world, typically 20 to 40 workers spend several hours sorting the trays for dispatch manually. In Denmark, an automated tray sorting system has been installed to queue up the trays in front of the correct trucks. That Danish system includes miles of transports, switching networks, and tray label readers to create queues of trays with a common destination. Such a system accepts loaded trays from multiple sorters in the sorting center, transports the trays to a dispatch area, and moves each tray through a series of switches down multiple sidings leading to truck loading areas. Only a few of these systems have been installed around the world because the expense of the automated tray sorting equipment is prohibitive, and it takes many years to pay for itself in labor savings.

Occasionally a tray of mail is loaded onto the wrong truck, so it is sent to the wrong delivery office. Because the deadlines are tight, often such errors are not discovered in time to recover, and it can therefore be very difficult to get the mail to the right place and delivered on the same day as the error was made. So, the service performance of the post is negatively affected by such occasional errors.

What is needed is a way to deliver the mail trays from the sorters to the trucks in exactly the order they are to be loaded onto the trucks. This would have the benefit of reducing the labor hours of the tray sorting staff, as well as reducing the errors of loading trays onto the wrong trucks. And, such a system would have the same benefits as automated tray sorting equipment, but without the prohibitive expense.

Examples of such a clamp-based system can be found in International Application WO 2006/063204 filed 7 Dec. 2005 titled "System and Method for Full Escort Mixed Mail Sorter Using Clamps" and can also be found in U.S. Provisional Application 11/519,630 filed 12 Sep. 2006 titled "Sorter, Method, and Software Product for a Two-Step and One-Pass Sorting Algorithm," which are both incorporated herein by reference in their entirety. The concepts of macro-sorting are described, for example, in U.S. Provisional Application No. 60/669,340 filed 5 Apr. 2005, titled "Macro Sorting System and Method" which also is incorporated herein by reference in its entirety.

SUMMARY OF THE INVENTION

The present invention overcomes the disadvantages of the prior art by providing the output from sorting system(s) in a sorting center as a queue of trays full of mail. The trays are in substantially an order in which the trays need to be loaded onto trucks. An advantage of the foregoing is that the trays do not need to be sorted. The only labor requirement is taking the trays from the queue in the same order in which they arrived, and loading them onto the trucks for delivery to the delivery offices.

The present invention unloads mail from the sorter in exactly the order in which it needs to be loaded on the trucks, which reduces the tray sorting labor and expense, by eliminating the need to sort filled mail trays to insure that each tray ends up on the correct dispatch truck. Additionally, this system eliminates the need for high rise tray storage and retrieval systems.

BRIEF DESCRIPTION OF THE DRAWINGS

The accompanying drawings illustrate presently various embodiments of the invention, and assist in explaining the principles of the invention.

DETAILED DESCRIPTION OF AN EMBODIMENT OF THE INVENTION

An embodiment of the present invention will now be described. It is to be understood that this description is for purposes of illustration only, and is not meant to limit the scope of the claimed invention.

Figure 7:
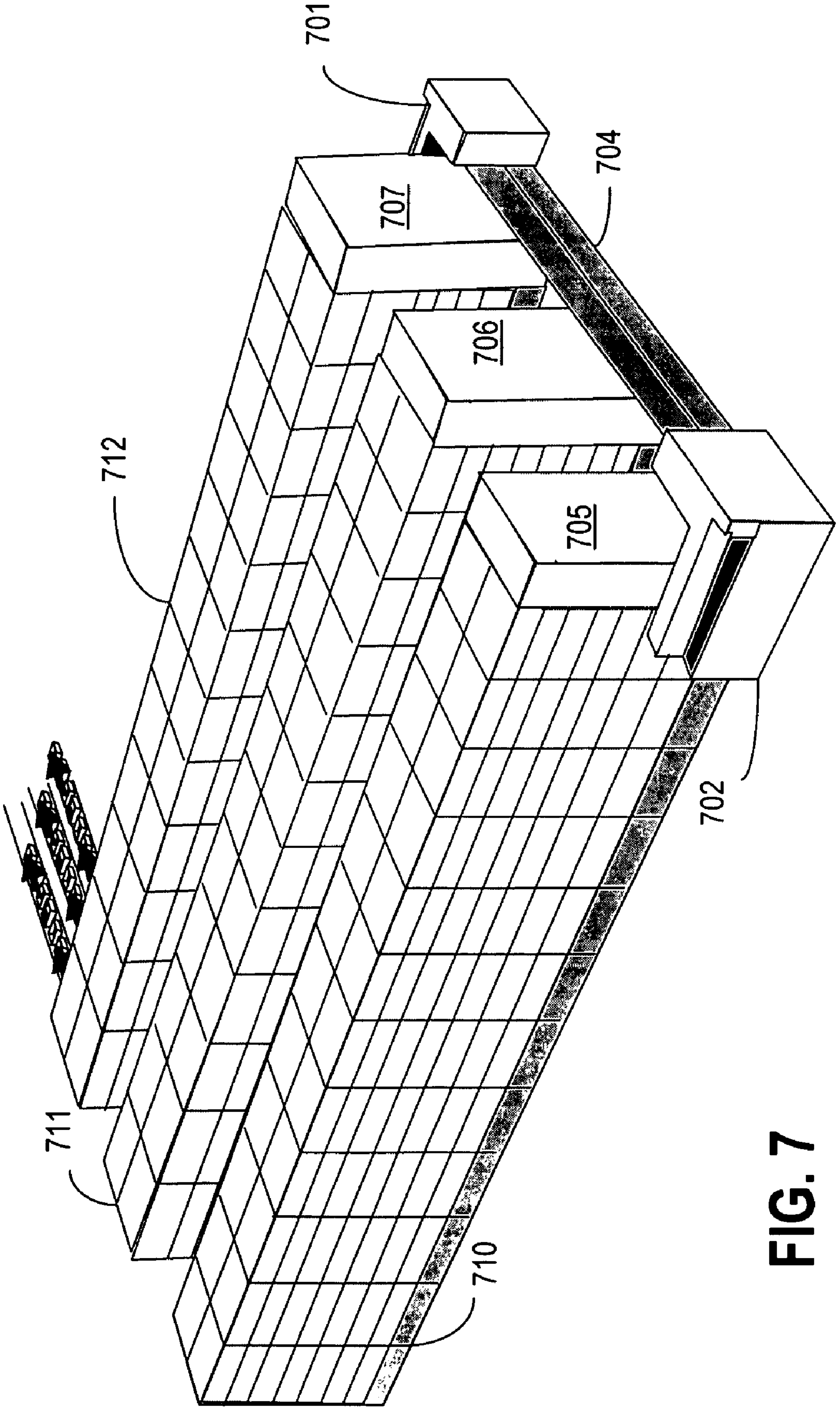
FIG. 7 shows a triple bank sorter according to an embodiment of the present invention.

It is possible to scale up a merge and sequence sorter concept, so that multiple zones of mail can be loaded and sorted to delivery sequence. FIG. 7, for example, shows a sorter that can accept unsorted mail destined for between 100 and 250 routes and sort it all to delivery sequence. The concepts of macro-sorting, and simultaneously sorting inbound and outbound mail, are described in U.S. Provisional Application No. 60/669,340 filed 5 Apr. 2005, titled "Macro Sorting System and Method" which has been incorporated herein by reference.

The inbound sorting operations (merging and sequencing) for these types of sorters can be conducted in three phases. Phase I involves loading all the mail into the sorter using one or more infeed stations. Each piece of inbound mail is loaded into a clamp, transported in face-to-face orientation with respect to other clamped mail pieces, and sorted into groups of one or more routes of mail and stored in storage legs in the upper tiers of the sorter. This could occur over a time period of 21 hours or less. Phase II starts after all the mail is loaded into the sorter during phase I, and includes moving individual large batches of mail from the large batch storage modules to the lowest tier one batch at a time, and sorting first into smaller batches each containing mail destined for between 15 to 60 addresses. Each of these smaller batches are then sorted one at a time to delivery sequence. When the mail is sorted to sequence, it then enters phase III, during which it is loaded into trays and sent to dispatch.

Phases II and III are fully automated. The sorter systematically moves the mail previously sorted and stored in large batches consisting of one or more routes during phase I from its storage location inside the sorter to the lowest tier to conduct the sort-to-smaller-batch and sort-to-sequence operations. The large batches of mail are transported one right after another through the bottom tier, and thereafter stacked into trays and sent to dispatch. It will be noted that the large batches of mail can be moved from the large batch storage areas in the upper tiers in any appropriate order. For the purposes of this invention, the order will be selected so that mail stored in multiple large storage legs of the sorter that is destined for common delivery offices (average of 20 routes of mail in the USPS), will be moved in an pre-determined sequence.

For example, in some sorting configurations, mail for two routes will be stored in each of the large storage areas (storage legs) of the sorter. Mail destined for one delivery office might therefore be stored in a total of 10 large storage areas. The mail from these 10 large storage areas (which may or may not be co-located in any part of the sorter) will be moved in a sequence one after another so that all the mail for these 20 routes is moved through the lowest tier of the sorter in a prescribed order, sorted to delivery sequence one route at a time, loaded into mail trays automatically, and transported away from the sorter in a queue of mail trays with, for example, the sequenced mail for the first route in the first several trays, followed by the sequenced mail for the second route in the next several trays, etc, for all 20 routes in order.

The sorter will then select the mail for the next delivery office from multiple large storage areas and move that through the final two phases of the sorting operations. This mail will be destined for another delivery office, but may need to be loaded on the same truck. It would not be uncommon, for example, for the mail from four to ten delivery offices to be loaded onto the same truck.

This truck delivery plan will be known in advance, and programmed into the sorter operating system. So, for example, if the truck delivery plan involves delivering mail to five delivery offices, the mail destined for the last delivery office of the truck delivery route will be unloaded from the sorter (from the multiple storage areas containing the mail for all the routes for that last delivery office), through the final sorting stages, transported to the truck, and loaded first onto the truck. The sorter would then move the mail destined for the second last stop on the delivery route through the sorter, into the trays, and transported to the dispatch area, where it will be loaded onto the truck in front of the mail destined for the last stop. And so on. The mail destined for the first stop on the delivery route will be unloaded from the sorter—in this example—fifth, and loaded onto the truck last so that it can be unloaded first.

The sorter will then proceed to process the mail to be loaded on the next truck, which may deliver mail to seven delivery offices. Again, the sorter will first move the mail from the large storage areas destined for the last stop on the delivery route, so that mail can be loaded onto the truck first.

Figure 1:
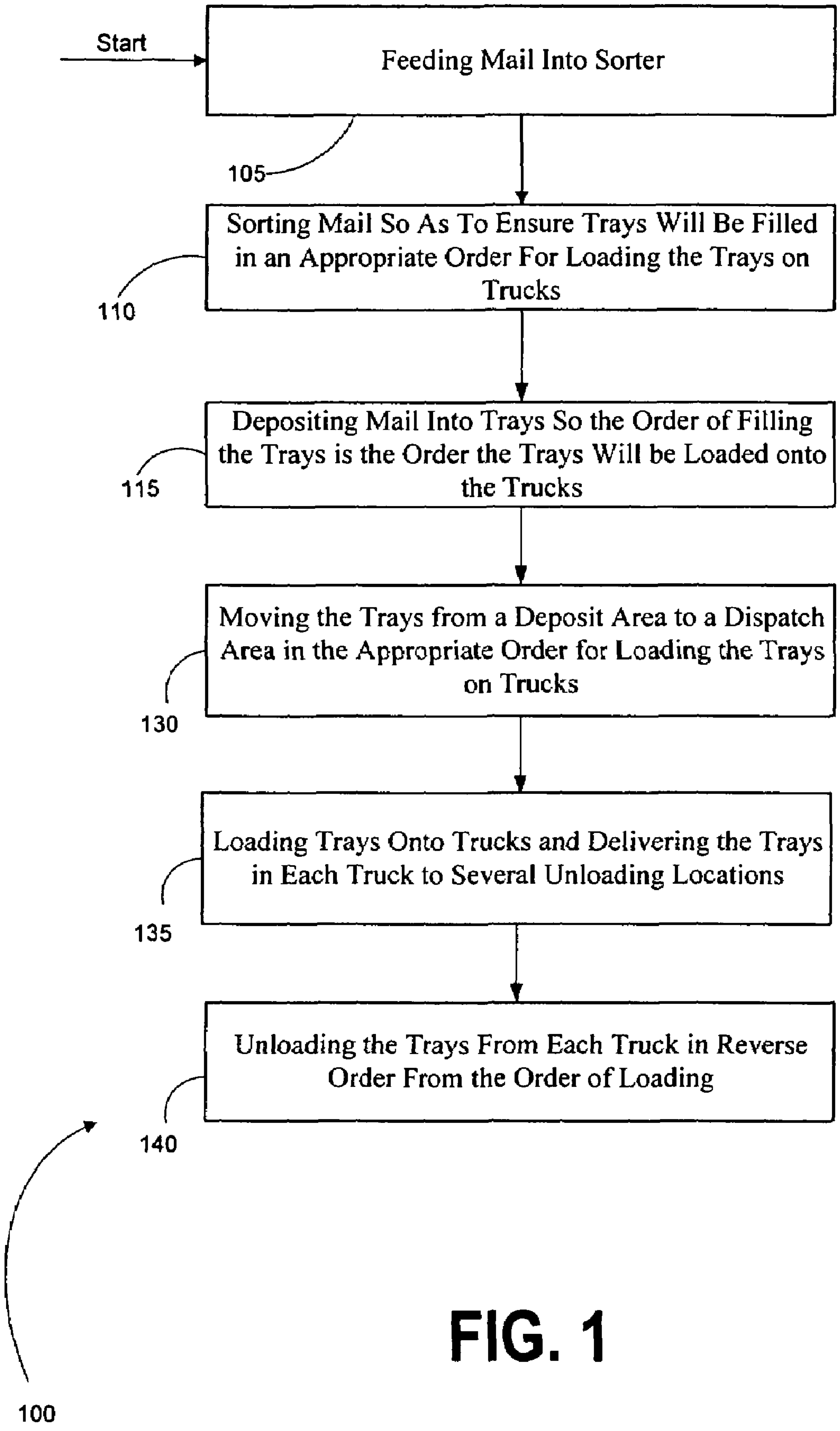
FIG. 1 is a flow chart showing a method according to an embodiment of the present invention.

As shown in FIG. 1, a method 100 according to an embodiment of the invention begins by feeding 105 mail into a sorter. Then the mail is sorted 110 so as to ensure trays will be filled in an appropriate or preferred order for loading the trays on trucks. The mail pieces are then deposited 115 into trays in such a way that the order of filling the trays is substantially the order in which the trays will be loaded onto the trucks. Subsequently, the trays are moved 130 from the deposit area to a dispatch area, in the appropriate or preferred order for loading the trays onto trucks. The trays are then loaded onto the trucks in the order in which they arrived. Each of the trucks then delivers 135 the respective trays to several unloading locations. And, the trays are unloaded 140 from each truck in substantially reverse order from the order in which they were loaded onto the trucks.

Figure 2:
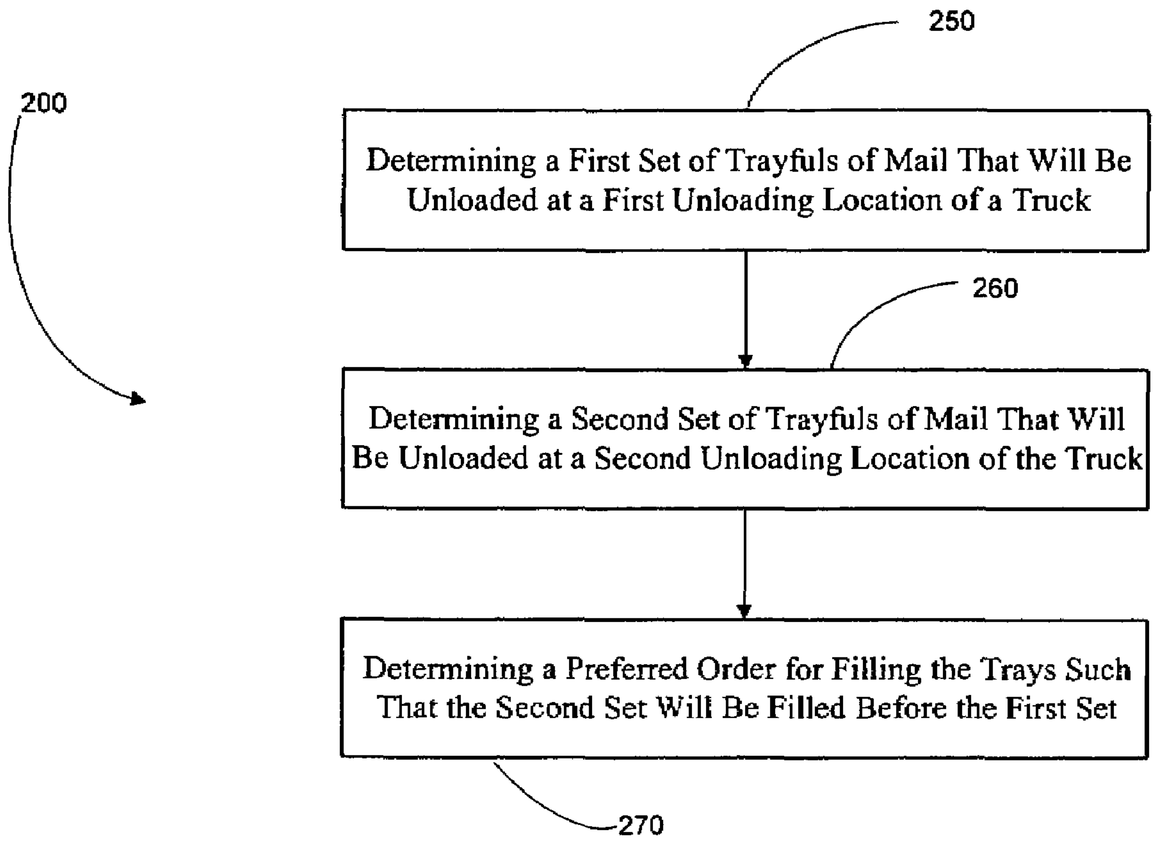
FIG. 2 is a flow chart showing a further method according to an embodiment of the present invention.

FIG. 2 provides a bit more detail about how the appropriate or preferred order is determined. According to the method 200 of FIG. 2, a determination 250 is made (e.g. by a processor) as to a first set of trayfuls of mail that will eventually be unloaded at a first unloading location of a truck. Then, a determination 260 is made as to a second set of trayfuls of mail that will eventually be unloaded at a second unloading location of the truck. And, a determination 270 is then made as to a preferred order for filling the trays, such that the second set will be filled before the first set. That way, the first set will be loaded onto the truck later than the second set, so that the first set can be conveniently removed from the truck earlier than the second set.

Figure 3:
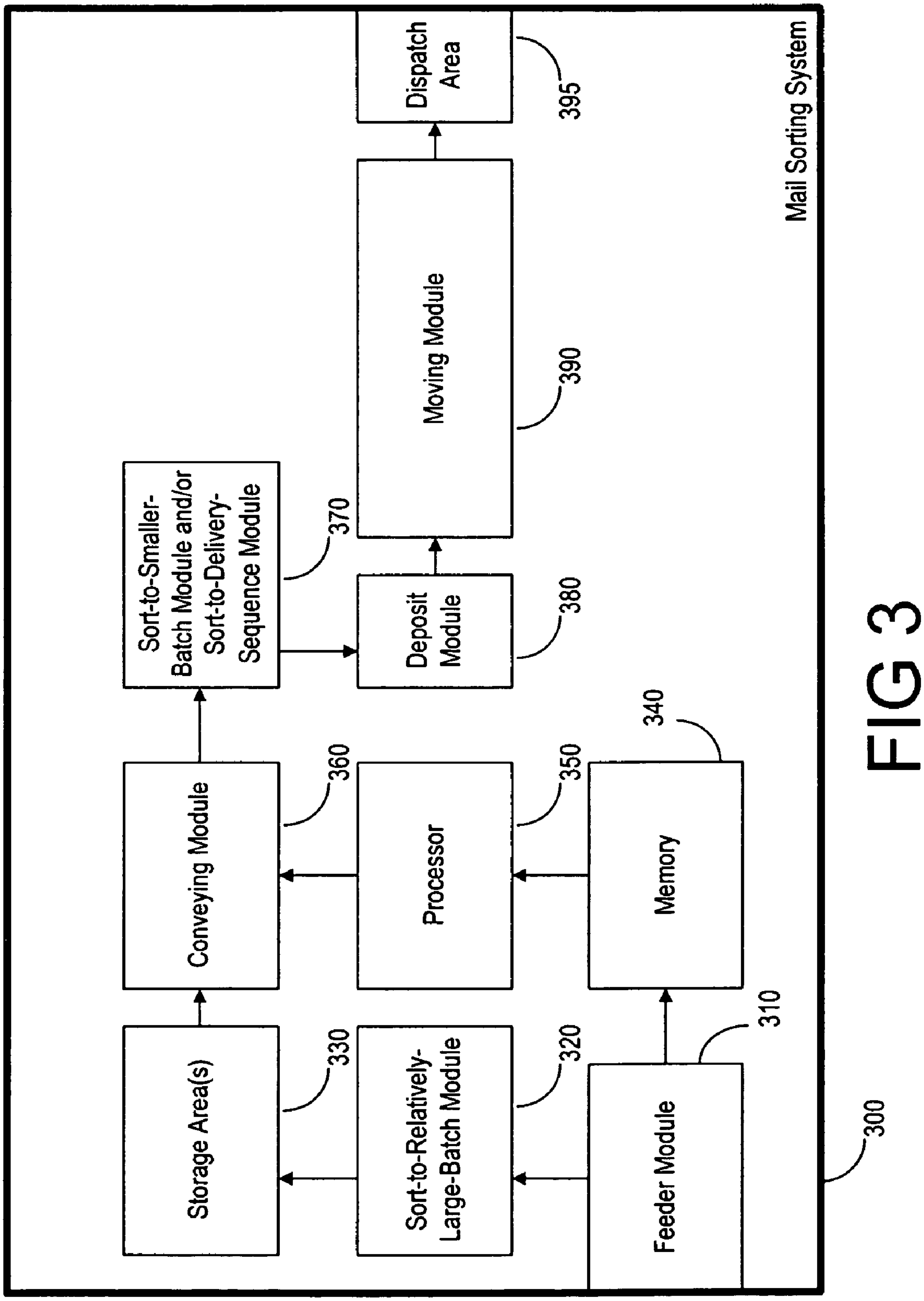
FIG. 3 is a block diagram showing a mail sorter according to an embodiment of the present invention.

Turning now to the block diagram of FIG. 3, a mail sorting system 300 is shown. A feeder module 310 is used to feed mail pieces into the system. As pieces are fed in, information about the pieces is acquired and stored in a memory 340. The mail pieces proceed to a sort-to-relatively-large-batch module 320, and from there to storage areas 330. A processor 350 accesses the information in the memory 340, in order to determine an appropriate or preferred order for loading trayfuls of the mail onto trucks, and the processor 350 ensures that mail pieces are conveyed by a conveying module 360 from the storage area 330 in a proper order that will facilitate loading the trayfuls onto the trucks. The conveying module 360 conveys the mail pieces to a sort-to-smaller-batch module and/or a sort-to-delivery-sequence module 370, which then provides the mail pieces to a deposit module 380. The deposit module 380 deposits the mail pieces into the trays. The trays are then moved by a moving module 390 directly to a dispatch area 395, without any need for the moving module to rearrange the trays or otherwise sort the trays, due to the fact that the sorting has already ensured that the trays will be in a correct order for dispatch to the trucks.

Algorithms for implementing this system for moving trays in proper order for dispatch can be realized using a general purpose or specific-use computer system, with standard operating system software conforming to the method described above. The software product is designed to drive the operation of the particular hardware of the system. A computer system for implementing this embodiment includes a CPU processor 350 or controller, comprising a single processing unit, multiple processing units capable of parallel operation, or the CPU can be distributed across one or more processing units in one or more locations, e.g., on a client and server. The CPU may interact with a memory unit 340 having any known type of data storage and/or transmission media, including magnetic media, optical media, random access memory (RAM), read-only memory (ROM), a data cache, a data object, etc. Moreover, similar to the CPU, the memory may reside at a single physical location, comprising one or more types of data storage, or be distributed across a plurality of physical systems in various forms.

Figure 4:
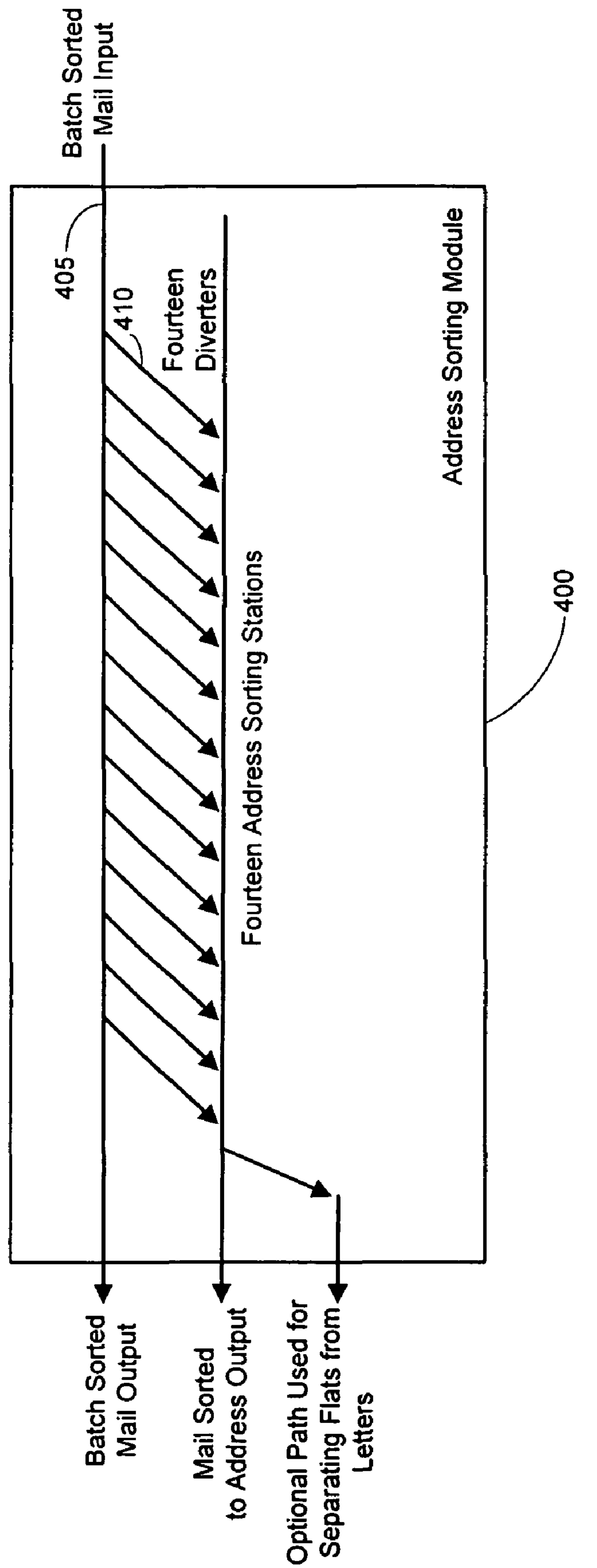
FIG. 4 shows an address sorting module according to an embodiment of the present invention.

For sorting configurations in which sort to delivery sequence is a functional requirement, an average of five mail pieces will likely be sorted to each address in embodiments for use in the United States, and an average of two to three will be sorted to each address in typical European applications. A sorter module with 14 to 20 paths between the input side (unsorted mail) and the sorted side is an appropriate design. FIG. 4 shows an example of this type of sorting module, which can be referred to as a sort-to-delivery-sequence module 400.

As mentioned, this embodiment of the invention includes batch sorting modules, for sorting large batches to small batches, as well as address sorting modules for sorting to delivery sequence. FIG. 4 shows the address sorting module 400. These address sorting modules may have the following functions and characteristics, in an embodiment of the invention that utilizes clamps to hold the mail pieces.

Figure 5:
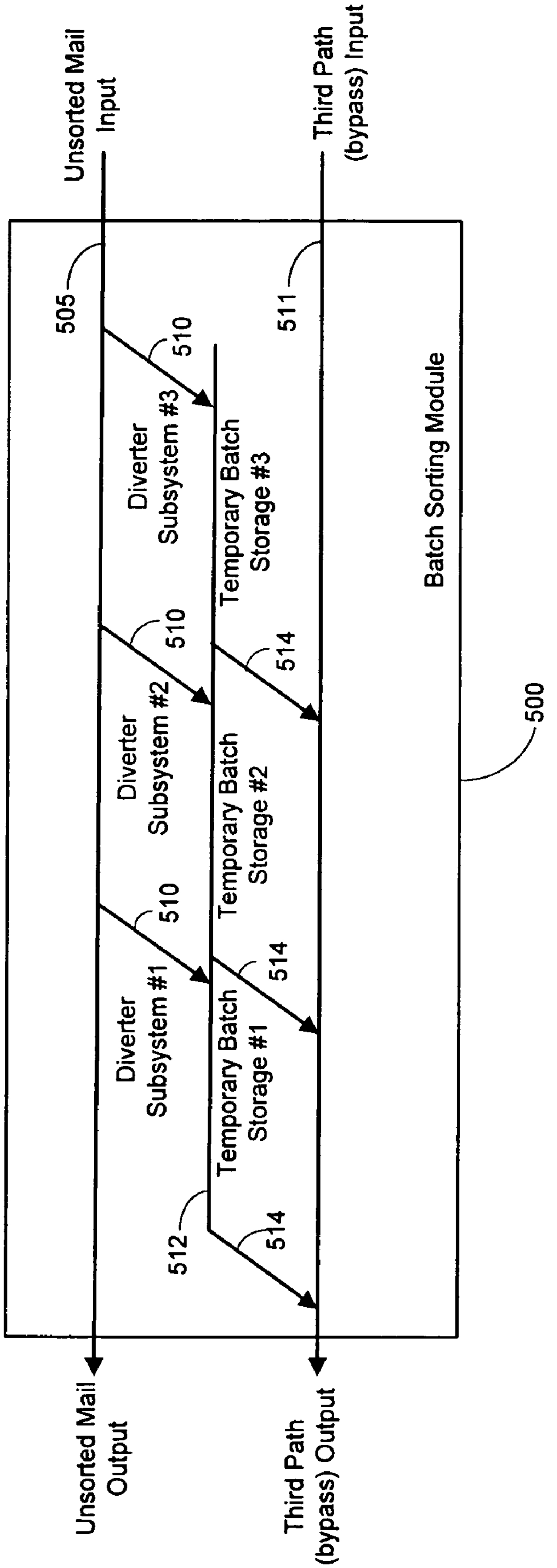
FIG. 5 shows a batch sorting module according to an embodiment of the present invention.

The address sorting module will accept sequential batches of clamped mail from the third path 511 of the upstream batch sorting module 500 shown in FIG. 5, and will also accept information on the clamp identities and instructions for the disposition of each clamp (and mail piece) from a master controller or processor. The address sorting module 400 will read clamp identities as they enter the sorting module.

Each address sorting module will have a first path 405 for transporting clamped unsorted mail, which is either aligned with the third path of the upstream module when the upstream module is a batch sort module, or with the first path when the upstream module is an address sorting module. The input to this first path of the address sorting module is a batch of clamped mail handed off from an upstream module, each batch containing mail destined for a number of addresses not to exceed the number of address sorting stations. The outputs to this first path of the address sorting module include fourteen diverter stations (in the present example), in order to move the mail sideways off the transport, and a means to hand the partial batches of mail to additional address sorter modules downstream.

In the current example, each address sorting module has fourteen diverter subsystems 410 to move mail from the first mail path 405 to the fourteen assignable address stations 415. These diverter subsystems could operate identically to the three diverter systems designed for the small batch sorting modules (described later), and preferably have identical components.

Moreover, each address sorting module will have fourteen mail storage transports for storing mail destined for each address. There are two inputs to each of these address storage transports: the first input is a diverter transport carrying clamps from the first (batch) mail path, and the second input includes clamps handed off from an upstream address storage transport. The single output for each address sorting transport will pass the mail onto the next address storage transport—which may be the first address storing transport in the next module. The last address storing transport will hand the mail off to an output (de-clamping or stacking) module.

The storage capacity of each address storage transport may be a maximum of 10 clamps each holding mail pieces 0.2 inches thick or less. The capacity will be reduced when the batch being stored contains thicker mail pieces. The intent of this capacity target is to accommodate European routes where each address receives an average of 2.5 mail pieces per day. The 10 pitch storage system will accommodate heavy mail days of up to 10 of the thinnest pieces per address, or will accommodate heftier average thickness of each piece being up to 1.0 inches thick, (or some combination of these two possibilities.) Note that this storage capacity for each address station is four times the average mail to be sent to each address each day.

As an example, one configuration of the sorter may have a total of 28 address stations to sort mail previously batched for 25 addresses; these address stations are provided by two address sorting modules per sorting system, each sorting module having a 14-address sorting capability. Thus, three address stations can be used as overflow for specific addresses that receive more than the ten-piece maximum storage capability of the single address station.

FIG. 5 shows a small batch sorting module 500 according to an embodiment of the present invention. The small batch sorting module will accept a queue of clamped mail from one or more large batch storage areas, and will also accept information on the clamp identities and instructions for the disposition of each clamp (and mail piece) from the master controller or processor.

Each small batch sorting module will have a first path 505 (i.e. unsorted path) for transporting clamped mail that has not yet been sorted to small batch; the outputs may include, for example, three diverter stations to move the mail sideways off the transport, and a means to hand the unsorted mail off to a sorter module or an output module downstream.

Each small batch sorting module will have, for example, three diverter subsystems 510 to move mail from the unsorted path 505 to respective temporary batch storage stations 512. The diverter subsystems will have three major sub-components. First, a diverter subsystem will have a means to move one clamp off the unsorted mail transport and onto a diverter transport without disturbing the clamp before or after the diverted clamp on the unsorted mail transport. The actuator for this mechanism will be responsive to commands from the module controller. The cycle time for the diverting mechanism will be sufficient to enable diverting of either single or adjacent clamps onto the diverting transport. Second, a diverter subsystem will have a transport for transporting diverted clamps from the unsorted mail path to the temporary batch storage area. It is expected that this transport will be positioned at an angle from the unsorted path such that the component of velocity parallel to the unsorted path will match the speed of the unsorted path. Hence, the relative motion between the mail pieces is limited to mail moving sideways out of the queue of unsorted mail. Third, a diverter subsystem will have a means to transfer the clamps from the diverting transport to the batch storage transport.

According to this embodiment, each small batch sorting module will have three (3) temporary batch storage transports (or stations) for storing batches of mail. There are as many as two inputs to each batch storage transport: the diverter transport 510 carrying clamps from the unsorted mail path 505, and clamps handed off from an upstream batch storage transport. Likewise, there are as many as two outputs for each batch storage transport: an output 514 to the third path/exit transport 511, and an output to a downstream batch storage transport.

The operation of the batch storage transport will be intermittent; it will advance all mail pieces stored whenever a new piece has been added from either of the two inputs. The storage capacity of each batch storage transport may be a maximum of 115 clamps each holding mail pieces 2 mm thick or less. The capacity will be reduced when the batch being stored contains thicker mail pieces. The intent of this capacity target is to satisfy two objectives: first, capacity to hold mail for 25 addresses on European routes, each address receiving an average of 2.5 mail pieces per day, the average thickness of each piece being 1.3× the standard pitch of 0.2 inches and, second, and capacity that allows 40% excess capacity for high volume mail days.

As mentioned, each small batch sorting module will have a third path (i.e. batch output path) 511 for advancing clamped mail past downstream batch storage transports, directly to other modules down stream such as the address sorting modules or the stacker modules. The third path transports will accept clamped mail from any of the three batch storage transports, or from the third path in an upstream module. The third path will transfer the clamped mail to the input of the third path on the next downstream module. The third path speed will be compatible with the rate of transferring clamped mail onto the transport. Mail will be transferred to the third path under the following conditions: for the merge and sequence operation, when the last clamp having unsorted mail passes the diverter station associated with the batch storage transport, the clamped mail stored on the batch storage transport can be transferred to the third path. This empties the batch storage transport so that the next large batch of mail can be started down the unsorted mail path. Note the possibility that the unsorted path may be utilized as (or transformed into) the batch output path once all of the mail pieces have been diverted from the unsorted path.

The first stage of sorting operations involves feeding mail, measuring one or more of its dimensions, scanning and interpreting the destination address of each mail piece, and loading it into clamps—all of which is done in the modules 701 and 702 shown in FIG. 7. A sorter controller includes a database which stores the scanned and measured information and associates it with a unique clamp identifier for the clamp holding the mail piece. The clamped mail is transported from the feeding modules 701 and 702 to one of three sorter banks 710, 711, or 712 via clamped mail transport 704. The two feeding modules and the three sorter banks in FIG. 7 are shown only as an example, and it will be understood that from one to eight feeders and from one to 15 sorter banks might be included in a practical sorting system. The sorter controller commands one of three diverters on the transport 704 (not shown) to divert each piece of clamped mail off transport 704 and onto one of three spiral elevator transports 705, 706, or 707 depending on the sorted destination of the mail piece. The controller further commands one of multiple diverter mechanisms in the spiral elevator transports to divert each clamped mail piece off the spiral elevator transport and into an appropriate large batch storage area designated to receive mail destined for a range of adjacent addresses including the address for each clamped mail pieces diverted thereto. The diverting mechanisms on transport 704 and spiral elevators 705, 706, and 707 are similar to 510 shown in FIG. 5. In this first phase of operation, the random order mail pieces are sorted to large batches containing all the mail destined for addresses on one or more routes.

Figure 6:
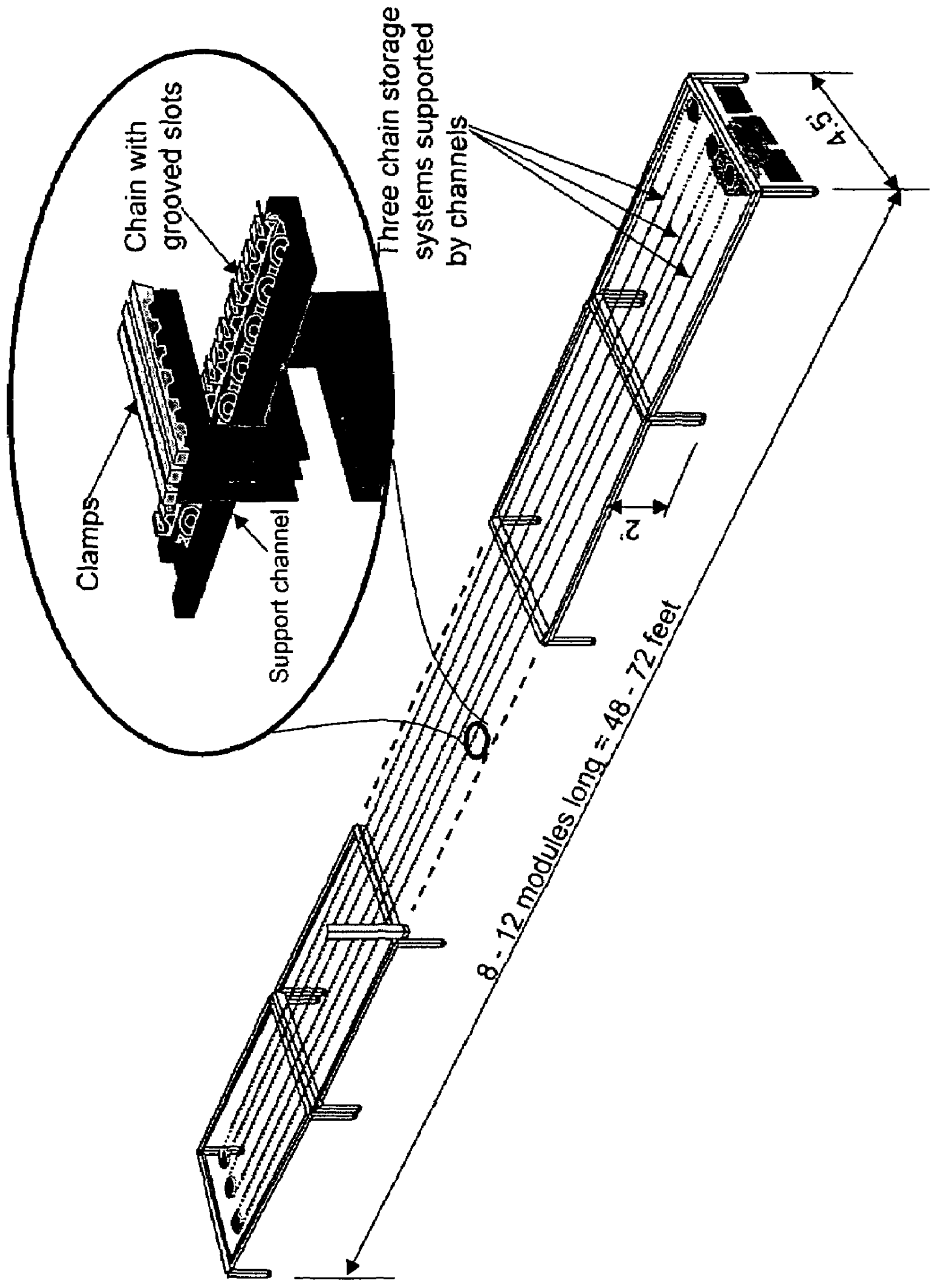
FIG. 6 shows a route storage module, according to an embodiment of the present invention.

Mail that is initially sorted into large batches, or groups of one or more routes of mail, is stored in storage legs as shown in FIG. 6, which are located in the upper tiers of the sorter as shown in FIG. 7. Subsequently, mail stored in the large storage modules (see FIG. 6) which are located in the upper tiers of the sorting system shown in FIG. 7, are transported through multiple sort-to-small-batch modules shown in FIG. 5, and each small batches is finally moved through one or more sort-to-address modules as shown in FIG. 4. The sort-to-small-batch modules and the-sort-to-address modules are located on the lowest tiers of the multi-bank sorter system shown in FIG. 7.

It is to be understood that all of the present figures, and the accompanying narrative discussions of preferred embodiments, do not purport to be completely rigorous treatments of the methods and systems under consideration. A person skilled in the art will understand that the steps of the present application represent general cause-and-effect relationships that do not exclude intermediate interactions of various types, and will further understand that the various structures and mechanisms described in this application can be implemented by a variety of different combinations of hardware and software, and in various configurations which need not be further elaborated herein.

What is claimed is:

1. A method for sorting mail pieces comprising:

feeding the mail pieces into a sorter;

sorting the mail pieces;

depositing the mail pieces into containers in at least one deposit area; and moving the containers from the at least one deposit area to at least one dispatch area, substantially in a loading order using a processor, in which the containers will be loaded into at least one vehicle for convenient unloading at a plurality of unloading locations of each of the at least one vehicle;

wherein the containers are mail trays or other devices for carrying a plurality of the mail pieces.

2. The method of claim 1, wherein the loading order is substantially equivalent to a deposit order in which the containers received the mail pieces.

3. The method of claim 1, further comprising delivering the containers in the at least one vehicle to the respective unloading locations along a route of each of the at least one vehicle.

4. The method of claim 3:

wherein the sorting and the depositing are performed so that, for one of the at least one vehicle, the mail pieces that will be unloaded at a first one of the unloading locations are deposited into a first set of at least one of the containers, and the mail pieces that will be subsequently unloaded at a second one of the unloading locations are deposited into a second set of at least one of the containers, and wherein the second set precedes the first set in the loading order.

5. The method of claim 4, wherein the sorting comprises at least one batch sorting stage, and a final sort into delivery sequence stage, and wherein the at least one batch sorting stage sorts the mail pieces into an order calculated to ensure that the second set will precede the first set.

6. The method of claim 3, further comprising unloading a plurality of the containers from each of the at least one vehicle, at the unloading locations, in substantially reverse order from the loading order.

7. The method of claim 3, wherein the sorting comprises sorting into a plurality of relatively large batches and storing the relatively large batches in a plurality of storage areas within the sorter.

8. The method of claim 3, wherein the method further comprises determining a preferred order in which the containers will be unloaded from the at least one vehicle at the unloading locations;

wherein the method further comprises conveying the mail pieces from each of the plurality of storage areas in a selected order associated with the preferred order for unloading the containers from the at least one vehicle.

9. The method of claim 3, wherein the sorting further comprises sorting the mail pieces moved from each of the plurality of storage areas to relatively small batches that are smaller than the large batches;

wherein the placing further comprises placing the relatively small batches into the containers in a specified order associated with said preferred order; and wherein the specified order is substantially equivalent to said loading order.

10. The method of claim 1, further comprising:

loading the containers onto the at least one vehicle in said loading order;

wherein the unloading locations are a plurality of delivery offices;

wherein the at least one vehicle comprises at least one dispatch truck for delivering the containers to the plurality of delivery offices;

wherein said loading order is dependent upon a delivery route of the at least one dispatch truck to the plurality of delivery offices;

wherein, in said loading order, the containers require no sorting prior to said loading the containers onto said at least one dispatch truck.

11. A method for sorting mail pieces comprising:

feeding the mail pieces into a sorter;

sorting the mail pieces;

depositing the mail pieces into containers in at least one deposit area; and moving the containers from the at least one deposit area to at least one dispatch area using a conveying module, in a loading order which is the order in which the containers will be loaded into at least one vehicle for convenient unloading at a plurality of unloading locations of each of the at least one vehicle;

wherein the containers are mail trays or other devices for carrying a plurality of the mail pieces.

* * * * *